US011127047B2

(12) United States Patent
Gregori et al.

(10) Patent No.: US 11,127,047 B2
(45) Date of Patent: Sep. 21, 2021

(54) DIGITAL PROMOTION SYSTEM USING DIGITAL COLLECTIBLES

(71) Applicant: SAP SE, Walldorf (DE)

(72) Inventors: Lars Gregori, Munich (DE); Anja Wilbert, Munich (DE); Georg Kreimer, Munich (DE); Denise Wildner, Munich (DE); Jose Enrique Gonzalez Modecir, Gauting (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/227,087

(22) Filed: Dec. 20, 2018

(65) Prior Publication Data

US 2020/0202390 A1    Jun. 25, 2020

(51) Int. Cl.
| | | |
|---|---|---|
| *G06Q 30/00* | (2012.01) | |
| *G06Q 30/02* | (2012.01) | |
| *G06Q 20/12* | (2012.01) | |
| *G06T 13/40* | (2011.01) | |
| *G06K 9/00* | (2006.01) | |
| *G06Q 50/00* | (2012.01) | |
| *G06Q 20/32* | (2012.01) | |

(52) U.S. Cl.
CPC ..... *G06Q 30/0269* (2013.01); *G06K 9/00671* (2013.01); *G06Q 20/123* (2013.01); *G06Q 30/0238* (2013.01); *G06Q 30/0267* (2013.01); *G06T 13/40* (2013.01); *G06Q 20/3274* (2013.01); *G06Q 50/01* (2013.01)

(58) Field of Classification Search
CPC .......... G06Q 30/0269; G06Q 30/0238; G06Q 20/123; G06Q 30/0267; G06Q 20/3274; G06Q 50/01; G06Q 20/387; G06Q 20/405; G06K 9/00671; G06K 9/22; G06K 9/3241; A63F 13/12; G06F 3/048; G06T 13/40
USPC ........................................ 705/14.38; 715/757
See application file for complete search history.

(56) References Cited

U.S. PATENT DOCUMENTS

| | | | | |
|---|---|---|---|---|
| 2013/0024371 | A1* | 1/2013 | Hariramani | G06Q 20/36 705/41 |
| 2018/0350144 | A1* | 12/2018 | Rathod | G06Q 20/3276 |

* cited by examiner

*Primary Examiner* — Sun M Li
(74) *Attorney, Agent, or Firm* — Fish & Richardson P.C.

(57) ABSTRACT

The present disclosure involves systems, software, and computer implemented methods for providing digital promotions using digital collectibles. One example method includes receiving an image file from a client application associated with a particular user profile. Image recognition is performed on the image file to identify at least one product associated with a digital collectible promotion. A digital collectible associated with the at least one product is identified. A first offer is transmitted, for presentation in the client application, for an availability of the digital collectible upon a transaction including the at least one product. An indication of a transaction associated with the particular user profile that includes the at least one product is received, from a merchant. Instructions to enable at least one digital collectible at the client application for the particular user profile are transmitted, in response to the transaction.

16 Claims, 15 Drawing Sheets

DIGITAL PROMOTION SYSTEM USING DIGITAL COLLECTIBLES

TECHNICAL FIELD

The present disclosure relates to computer-implemented methods, software, and systems for providing digital promotions using digital collectibles.

BACKGROUND

Augmented reality can enhance the real world by supplying computer generated data onto a view of reality. For example, computer generated images (CGI) can be superimposed onto a view of reality such as a real-world image or video, or animation(s). Augmented reality can provide an interactive experience of a real-world environment where the objects that reside in the real-world are augmented by computer-generated perceptual information, across one or more sensory modalities. The augmented information can be seamlessly interwoven with the view of the real world to create an immersive aspect of the real environment. Augmented reality can be distinguished from virtual reality, which can entirely replace a user's real-world environment with a simulated environment.

SUMMARY

The present disclosure involves systems, software, and computer implemented methods for providing digital promotions using digital collectibles. One example method includes receiving an image file from a client application associated with a particular user profile. Image recognition is performed on the image file to identify at least one product associated with a digital collectible promotion. A digital collectible associated with the at least one product is identified. A first offer is transmitted, for presentation in the client application, for an availability of the digital collectible upon a transaction including the at least one product. An indication of a transaction associated with the particular user profile that includes the at least one product is received, from a merchant. Instructions to enable at least one digital collectible at the client application for the particular user profile are transmitted, in response to the transaction.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
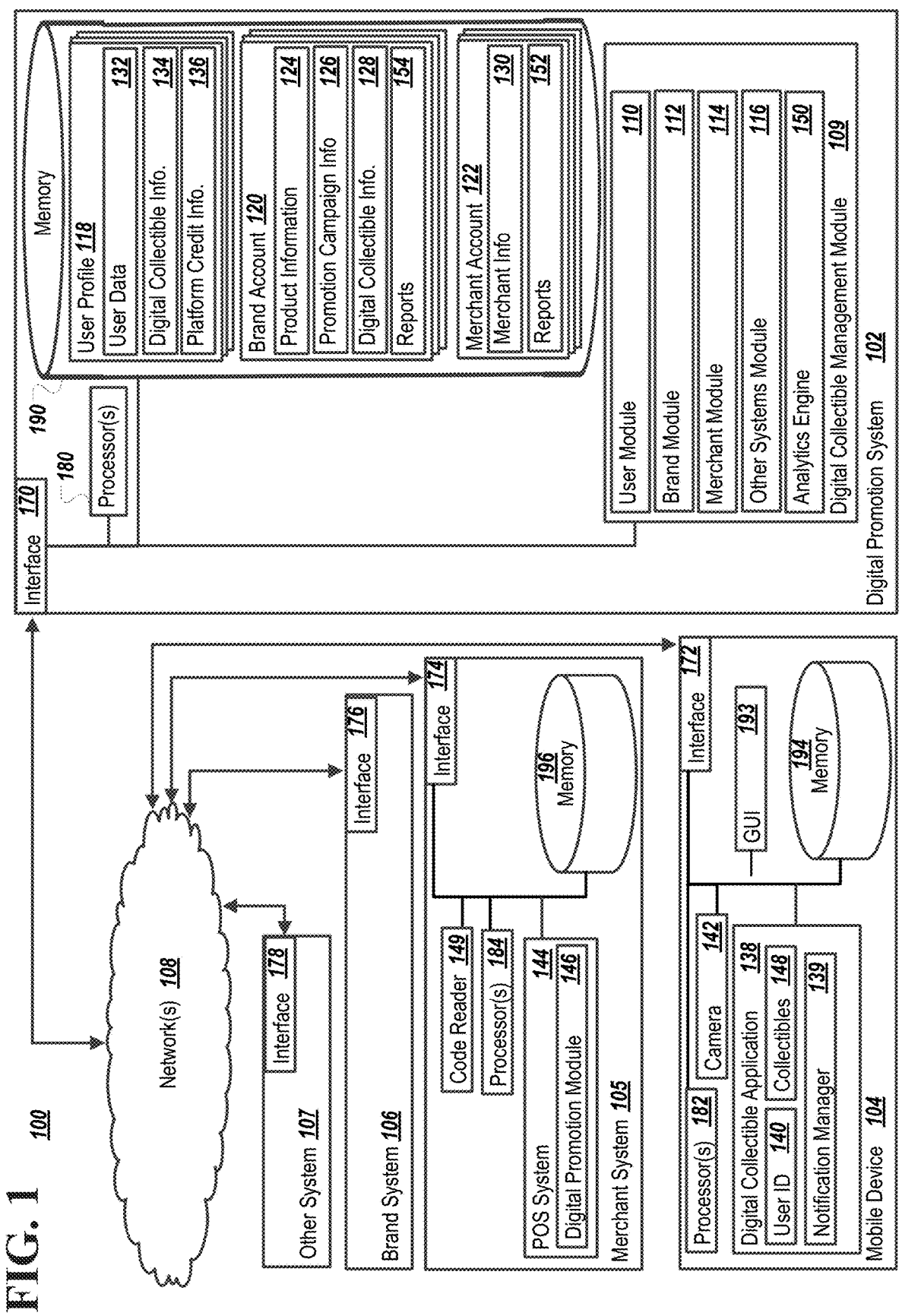
FIG. 1 is a block diagram illustrating an example system for providing digital promotions using digital collectibles.

A digital promotion system can provide a platform that enables in-store engagement, for multiple brands and multiple retailers, with brand-selected promotions. In-store shelf-space can be digitized using object recognition and augmented reality, resulting in an opportunity for brands to engage with customers directly in-store and at a POS (Point of Sale) by offering digital experiences. For instance, the digital promotion system can include a gamification system that provides in-store and out-of-store experiences using digital collectibles. An example digital collectible is a digital avatar. A digital collectible is an item that has perceived value to consumers, can represent a particular brand, and can gain value over time (e.g., through upgrades).

For example, avatars can be linked to various products and can be unlocked by consumers through in-store product purchases (or other actions). In an example scenario, to unlock an avatar, a customer can identify a product using an application (e.g., using image recognition) and link a purchase of the product to a personal profile through, for example, a QR (Quick Response) code scan during checkout. Product purchases can involve product discounts (which can be revealed to the user when the user uses the application to identify the product). Avatars can be upgraded through upgrades, which may be "purchased" using platform credits (e.g., coins). Platform credits can be earned, for example through further purchases of a same or related product from the brand, or through social activity (e.g., social posts that include the collectible along with a brand or product hashtag).

Platform credit can be earned in other ways, such as using an avatar in a third party gaming environment. The user can earn platform credit by gaining status or skills using the avatar as a gaming character in the third party gaming environment. The gaming character can represent a brand and can have specials skills or powers only available to brand-related avatars. The brand can benefit through brand promotion in the third party gaming environment. The user can benefit by earning platform credit and by being able to use the special brand-related characters.

The use of a low-cost (per transaction) digital promotion system, with augmented reality and digital collectibles with upgrade options can encourage continued product purchases, resulting in increased brand and retailer loyalty. Augmented reality and brand-specific avatars can provide an appealing application that consumers enjoy and choose to continually use. Marketing activities can be directly connected to customers who have already indicated an interest in a product (through use of an application), which can result in improved marketing as compared to mass marketing approaches. Brands and retailers can be provided direct data about customer purchases.

More specifically, for a brand, the digital promotion system can provide an alternative to impersonal mass communication. The platform can enable multiple brands to each digitally and directly connect to a given consumer based on user purchases of products of those brands at a point of sale. The platform can enable digital connections which may not be otherwise available for the brand. Digital collectibles can attract a customer to a product and brand, distinguishing the brand from a wide choice of similar products across multiple brands that may be available at a particular retailer. After a brand has digitally connected to a user at a POS, subsequent, individualized marketing opportunities can be enabled.

The use of brand-specific digital collectibles can increase brand awareness. For example, rather than a brand expending resources by purchasing advertisements, the brand can benefit from consumers promoting the brand on social media and other platforms. For instance, brand exposure can be built through user hash tags, spontaneous user reviews, use of an avatar in a third-party application, and user-driven promotion of brand content.

The digital promotion system can provide other advantages for brands. For example, insights can be gathered for a brand regarding how, where, and how many of the brand's products are being consumed and are of interest to consumers. The digital promotion system can enable cost-effective personalized marketing and promotions for low-price products which may have a low enough price point to be excluded from other types of marketing. A set of non-competing brands can use the digital promotion system to create coordinated campaigns.

Generally, an increase in consumer online shopping habits has resulted in a decrease of customers buying products in physical retail stores. The digital promotion platform can provide advantages for brick and mortar retailers. Obtaining and interacting with digital collectibles can create reasons for customers to come to physical stores. The digital promotion system can increase in-store traffic for physical retailers and consumer time spent in-store by connecting to customers at a POS and by offering augmented reality/gaming experiences which are only available in physical stores. Customers can go to physical stores to take part in gamified experiences and take advantage of rewards, including discounts in addition to offerings for digital collectibles. Insights can be provided by the system, to retailers, regarding an increase in in-store customer traffic resulting from digital promotions. Retailers can analyze insight data and react (e.g., expand, reduce, or customize promotions) to performance of items in store which are connected with the digital promotion system.

Consumers can also enjoy benefits of the system. Consumers can willingly participate in loyalty engagement, since they can be kept curious by continuously-posted brand offerings, that can be, for example, renewed, updated, reworked, or individualized brand offers. Consumers, including younger consumers, can be encouraged to visit brick-and-mortar retailers. Consumers can be encouraged by the prospects of gamification and original shopping experiences, using augmented reality and mobile devices, with customizable, upgradable avatars, and POS connections. Consumers can be motivated to engage more frequently with brands that offer content through the digital promotion system. Consumer participation can be encouraged, since the more active a consumer is, the more credit they can get for upgrading collectibles, and the more value they can add to their digital collectibles. Promotions can be personalized for consumers yet still be consistent (e.g., different avatars for different products, for different users, but presented and interacted with in a consistent manner).

FIG. 1 is a block diagram illustrating an example system 100 for providing digital promotions using digital collectibles. Specifically, the illustrated system 100 includes or is communicably coupled with a digital promotion system 102, a mobile device 104, a merchant system 105, a brand system 106, one or more other systems, including an other system 107, and one or more network(s) 108. Although shown separately, in some implementations, functionality of two or more systems or servers may be provided by a single system or server. In some implementations, the functionality of one illustrated system or server may be provided by multiple systems or servers. For example, although illustrated as including a single server, the system 100 can include multiple application servers, a database server, a workflow server, a centralized services server, or some other combination of systems or servers.

The digital promotion system 102 can manage digital promotions that include digital collectibles. A digital collectible management module 109 includes a user module 110, a brand module 112, a merchant module 114, and an other systems module 116. The user module 110 can manage user profiles, including a user profile 118, and communication with the mobile device 104 and other mobile devices. The brand module 112 can manage brand accounts, including a brand account 120, and communication with the brand system 106 and other brand systems. The merchant module 114 can manage merchant accounts, including a merchant account 122, and communication with the merchant system 105 and other brand systems.

The brand module 112 can provide an interface through which the brand system 106 can provide information to the digital promotion system 102. Product information 124, promotion campaign information 126, and digital collectible information 128 can be information received from the brand system 106, for example. The product information 124 can include product images and product codes. The digital collectible information 128 can include digital collectible artifacts (e.g., images, video, software code, 3D (three-dimensional) models, animations) for use when a digital collectible is used in augmented reality, and upgrade options (upgrade items, required platform credit). The promotion campaign information can 126 include campaign dates, a mapping of campaign product(s) to digital collectible(s), discounts, notification rules for consumers (e.g., how often and when to communicate with new users, inactive users, or users that own certain types or instances of digital collectibles), and campaign performance information, including how users reacted to brand promotions.

The merchant module 114 can provide an interface through which the merchant system 105 can provide information to the digital promotion system 102. For example, the merchant account 122 includes merchant information 130. The merchant information 130 can include merchant credentials, for communicating purchase information to the digital promotion system 102. In some implementations, the merchant information 130 includes location information for the merchant, and a listing of products defined in the product information 124 that are available for purchase at the merchant. In some implementations, the product information 124 in the brand account 120 lists merchants that carry given products.

The user profile 118 includes user data 132, digital collectible information 134, and platform credit information 136. The user data 132 can include a user identifier and user activity and characteristic information (e.g., which can be used for customizing digital campaigns or messages). Characteristic information can include, for example, demographic information (e.g., age, gender), or user preferences (e.g., either stated or derived). User activity information can include promotion reaction time statistics, loyalty scoring, or other data, for example. The digital collectible information 134 can indicate which digital collectibles a user has obtained, and status (e.g., upgrade completion). The platform credit information 136 can include a platform credit balance and transaction history. Platform credits can be earned through engagement with the digital promotion system 102. Platform credits can be used for upgrades of digital collectibles 148, for example.

The user module 110 can receive a registration request from the mobile device 104 for a user and generate a user identifier in response to the registration request. The user module 110 can enable the user to download an application for accessing the digital promotion system 102. For instance, a digital collectible application 138 can be downloaded to the mobile device 104. In some implementations, the digital collectible application 138 stores a user identifier 140.

The user module 110 can send digital promotion offers to the mobile device 104, based on the promotion campaign information 126. As an example, the user module 110 can send a notification to the mobile device, for presentation in the digital collectible application 138 (and/or in a home or start screen of the mobile device 104), upon detection of the mobile device 104 being in proximity to a merchant that carries at least one product included in a promotional campaign. As described below, either the digital collectible application 138 (e.g., a notification manager 139) or the digital promotion system 102 can determine that the mobile device is near a participating merchant.

The user can proceed to the merchant, and look for participating products. As discussed below, in-store signage and/or in-app notifications can guide the user to a store area that displays a participating product. The user can use the digital collectible application 138 to capture an image of the product. For instance, the digital collectible application 138 can be configured to interface with a camera 142 of the mobile device 104.

The digital collectible application 138 can present an augmented reality session that includes a digital collectible 148 associated with the product. For example, the digital collectible can be superimposed on top of an image of the product that is being presented as the user scans a shelf with the mobile device 104. The augmented reality session can enable a user to become familiar with the digital collectible. The augmented reality session can include informing the user that purchasing the product can allow the user to obtain the digital collectible.

The user can proceed to purchase the product at a checkout area of the merchant, including having the product scanned by a POS system 144 of the merchant. A digital promotion module 146 of the POS system can enable the user to provide the user identifier 140. For instance, the digital collectible application 138 can display a QR code that embeds the user identifier 140, and the digital promotion module can enable the POS system to scan the QR code using, for example, a code reader 149.

The digital promotion module 146 can be configured to send the QR code and purchased-product information to the merchant module 114. The digital collectible management module 109 can determine that a purchased product is associated with a digital collectible in a promotion campaign, and award the digital collectible to the user in response to the purchase, which can include updating the digital collectible information 134, and transmitting instructions and/or other artifacts to enable the digital collectible in the digital collectible application 138. Collectible information 148, including artifacts that enable the collectible on the mobile device 104, can be stored on the mobile device 104. A notification that the user has obtained the digital collectible can be sent by the user module 110 to the notification manager 139 and displayed on the mobile device 104. Linking a purchase with a user's account can also result in activation of e.g., financial discounts (e.g., at and/or after a time of sale), product bundling options, or other benefits.

As described below, the user can receive platform credit for interacting with a digital collectible. For instance, the user can create social network posts that include the digital collectible. The digital collectible application can send a notice of an interaction to the user module 110. The user module 110 can update the platform credit information 136 for the user to reflect an awarded credit.

The user can use the digital collectible application 138 to send an upgrade request for an upgrade to the digital collectible. The upgrade can cost a predefined amount of platform credit. The digital collectible application 138 can present upgrade options and costs. In response to receiving the upgrade request, the digital promotion system 102 can transmit instructions and/or other artifacts to enable the upgrade for the digital collectible in the digital collectible application 138 and debit a platform credit balance by an amount associated with the upgrade.

As described below, digital collectibles can be used in other systems, such as gaming environments. The other systems module 116 can interface with the other system 116 to enable use of a digital collectible in the other system 116. The user can gain platform credit by using digital collectibles in other third party systems.

An analytics engine 150 can provide analytics for both merchants (e.g., merchant reports 152) and brands (e.g., brand reports 154). The merchant reports 152 can give insight as to how digital campaigns may be increasing retailer traffic. The brand reports can provide insights regarding how, where, and how many of the brand's products are being purchased, and how many users are participating in digital promotion campaigns for the brand.

Although brick and mortar examples are discussed, digital collectibles can be awarded by the digital promotion system 102 based on online purchases. The merchant system 105 can be for an online merchant, for example. A user identifier for a user can be obtained by the merchant system 105 when a user makes an online purchase, for linking the product purchase with the user, so that a digital collectible associated with the product can be awarded to the user by the digital promotion system 102.

As used in the present disclosure, the term "computer" is intended to encompass any suitable processing device. For example, although FIG. 1 illustrates a single digital promotion system 102, a single mobile device 104, a single merchant system 105, a single brand system 106, and a single other system 107, the system 100 can be implemented using multiples of such devices. The digital promotion system 102, the brand system 106 and the merchant system 105 may be any computer or processing device such as, for example, a blade server, general-purpose personal computer (PC), Mac®, workstation, UNIX-based workstation, a cloud system, or any other suitable device. In other words, the present disclosure contemplates computers other than general purpose computers, as well as computers without conventional operating systems. Further, computing devices in the environment 100 may be adapted to execute any operating system, including Linux, UNIX, Windows, Mac OS®, Java™, Android™, iOS or any other suitable operating system. According to one implementation, the digital promotion system 102 may also include or be communicably coupled with an e-mail server, a Web server, a caching server, a streaming data server, a workflow server, an application server, and/or other suitable server.

Interfaces 170, 172, 174, 176, and 178 are used by the backend server 102, the mobile device 104, the merchant system 105, the brand system 106, and the other system 107, respectively, for communicating with other systems in a distributed environment—including within the system 100—connected to the network(s) 108. Generally, the interfaces 170, 172, 174, 176, and 178 each comprise logic encoded in software and/or hardware in a suitable combination and operable to communicate with the network(s) 108. More specifically, the interfaces 170, 172, 174, 176, and 178 may each comprise software supporting one or more communication protocols associated with communications such that the network(s) 108 or interface's hardware is operable to communicate physical signals within and outside of the illustrated system 100.

The digital promotion system 102, the mobile device 104, and the merchant system 105, each respectively include one or more processors 180, 182, or 184. Each processor in the processors 180, 182, and 184 may be a central processing unit (CPU), a blade, an application specific integrated circuit (ASIC), a field-programmable gate array (FPGA), or another suitable component. Generally, each processor in the processors 180, 182, and 184 executes instructions and manipulates data to perform the operations of a respective computing device.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The digital promotion system 102 includes memory 190. In some implementations, the digital promotion system 102 includes multiple memories. The memory 190 may include any type of memory or database module and may take the form of volatile and/or non-volatile memory including, without limitation, magnetic media, optical media, random access memory (RAM), read-only memory (ROM), removable media, or any other suitable local or remote memory component. The memory 190 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the backend server 102.

The mobile device 104 may be any client computing device operable to connect to or communicate in the network(s) 108 using a wireline or wireless connection. In general, the mobile device 104 comprises an electronic computer device operable to receive, transmit, process, and store any appropriate data associated with the system 100 of FIG. 1. The mobile device 104 can include one or more client applications, including the digital collectible application 138. A client application is any type of application that allows a client device to request and view content on the client device. In some implementations, a client application can use parameters, metadata, and other information received at launch to access a particular set of data from the digital promotion system 102. In some instances, a client application may be an agent or client-side version of the one or more enterprise applications running on an enterprise server (not shown).

The mobile device 104 is generally intended to encompass any client computing device such as a laptop/notebook computer, wireless data port, smart phone, personal data assistant (PDA), tablet computing device, one or more processors within these devices, or any other suitable processing device. For example, mobile device 104 may comprise a computer that includes an input device, such as a keypad, touch screen, or other device that can accept user information, and an output device that conveys information associated with the operation of the digital promotion system 104, or the client device itself, including digital data, visual information, or a GUI 193, respectively.

The GUI 193 interfaces with at least a portion of the system 100 for any suitable purpose, including generating a visual representation of the digital collectible application 138. In particular, the GUI 193 may be used to view and navigate various Web pages. Generally, the GUI 193 provides the user with an efficient and user-friendly presentation of business data provided by or communicated within the system. The GUI 193 may comprise a plurality of customizable frames or views having interactive fields, pull-down lists, and buttons operated by the user. The GUI 193 contemplates any suitable graphical user interface, such as a combination of a generic web browser, intelligent engine, and command line interface (CLI) that processes information and efficiently presents the results to the user visually.

Memory 194 and memory 196 respectively included in the mobile device 104 or the merchant system 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of mobile devices 104 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2A:
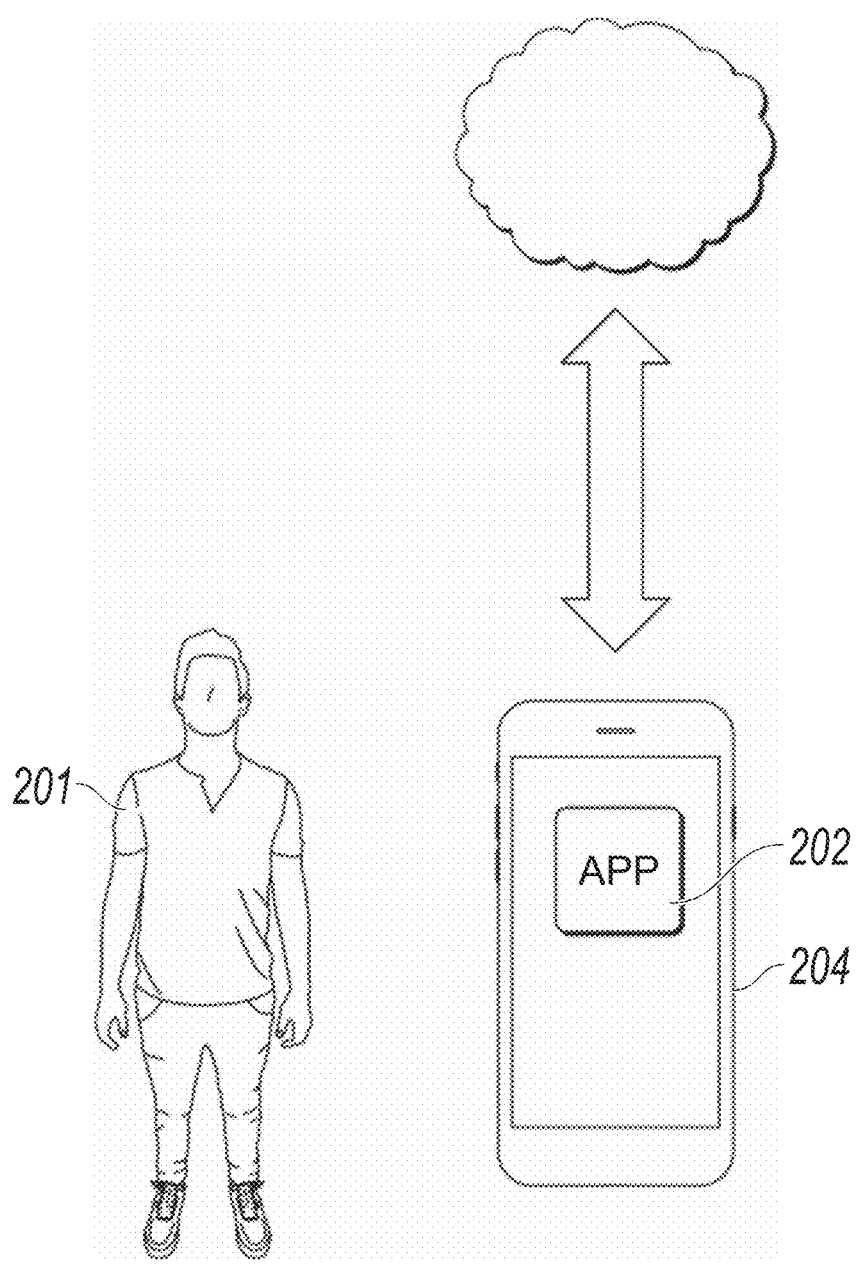
FIGS. 2A-2L illustrate conceptual user use cases with a digital promotion system.

FIGS. 2A-2K illustrate conceptual user use cases with a digital promotion system. FIG. 2A illustrates a first stage (e.g., stage "1") in which a user 201 downloads a digital collectible application 202 (e.g., from a digital promotion system) to a mobile device 204. The user 201 can use the digital collectible application 202 to create a user account in the digital promotion system.

Figure 2B:
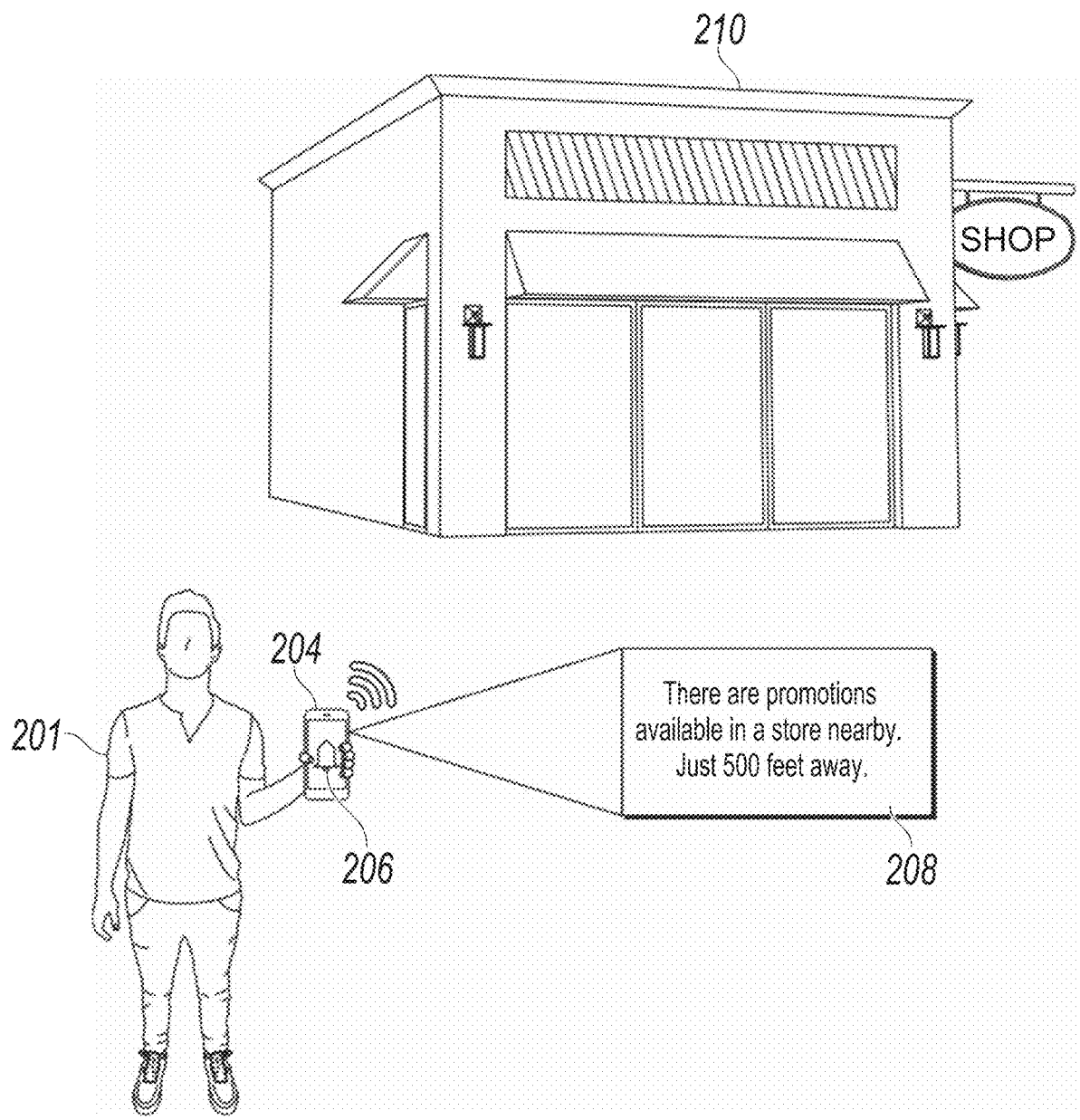

FIG. 2B illustrates a second stage in which the user 201 receives an alert 206 and/or a notification 208 on the mobile device 204 in response to the mobile device being within a threshold distance of a retail store 210 that sells product(s) that have affiliated digital promotions. The notification 208 indicates that a promotion is available in a nearby store. Detection of the user within proximity to the store 210 can be performed in various ways.

For example, the mobile device 204 can receive (e.g., periodically) product location data, to be stored on the mobile device 204 as local product information data, that maps store locations to products having digital promotions. The digital collectible application can be configured to monitor the user's location and to detect when the user's location is within a predetermined distance from a location included in the local product information data. As another example, the digital collectible application can be configured to periodically (e.g., every ten seconds) send location information for the mobile device 204 to a server of the digital promotion system. The server can be configured to detect that the received location information corresponds to a location that is within a predetermined distance from a store that sells a digital-offer-enabled product. Product location information can be provided to the server and/or to the mobile device, by brands and/or retailers.

Figure 2C:
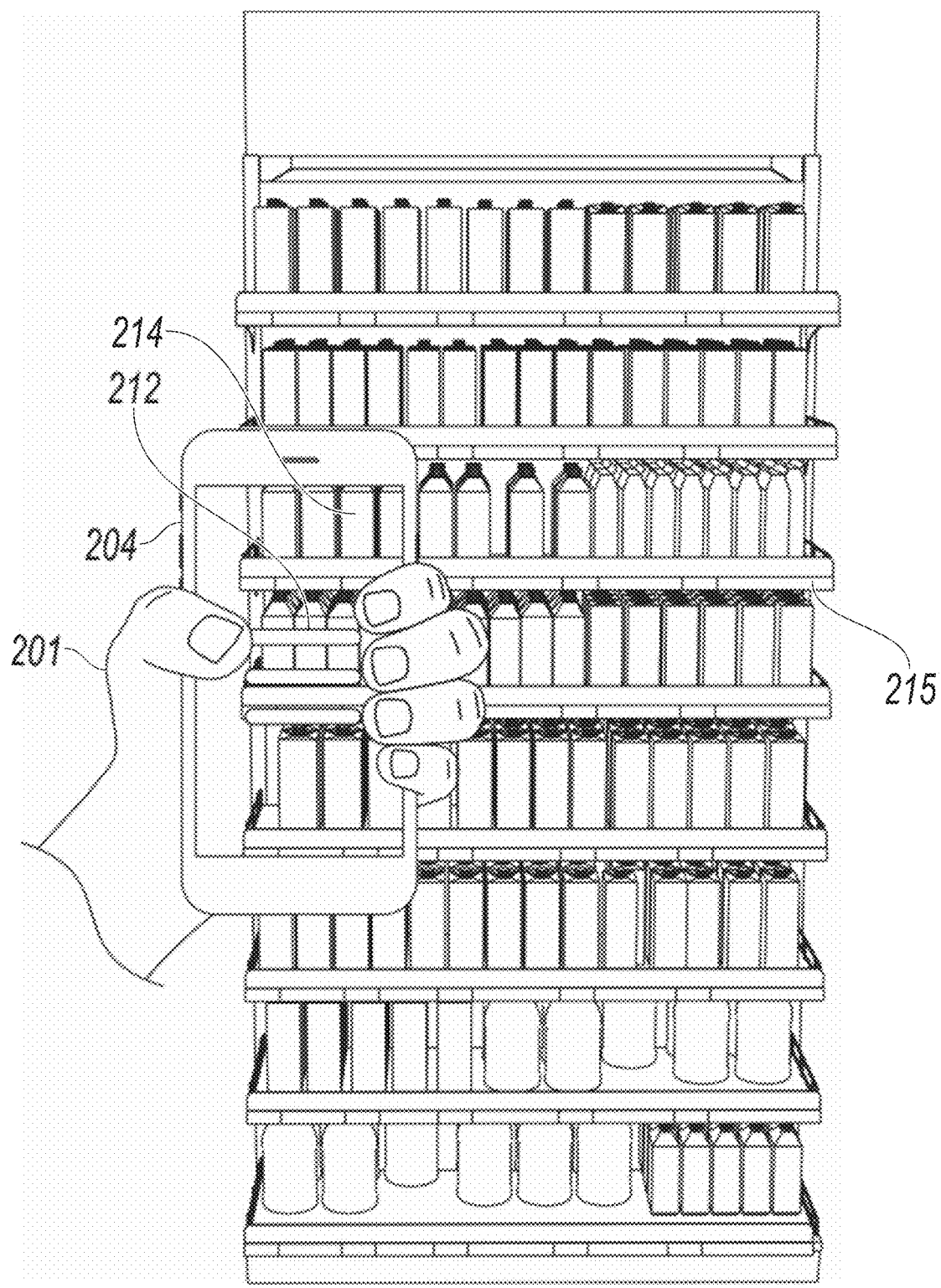

FIG. 2C illustrates a third stage in which the user 201 optionally uses a camera interface 212 of the digital collectible application to capture a product image 214 of a product on a shelf 215. The digital collectible application can determine, using machine learning and in real-time, that the product image 214 is an image of a digital-offer-enabled product.

The product image 214 can be identified as an image of a digital-offer-enabled product in a variety of ways. For example, object recognition can be performed, by the mobile device 204 or a server, to match the product image 214 to an image of a known digital-offer-enabled product. The mobile device 204 can send an image captured by the camera interface 212, that includes the product image 214, to the server, for example. Object recognition can include determining that packaging of the product as depicted in the product image 214 matches packaging in a template image, or that a code (e.g., UPC (Universal Product Code), QR code, or other identifier) matches a code of a known digital-offer-enabled product. The mobile device 204 and/or the server can have a machine learning component that learns how to identify products and determine which products are associated with promotions.

In some implementations, the digital collectible application guides the user to the shelf 216 while the user is in the store. In some implementations, an in-store notification is sent to the mobile device 204, e.g., by an in-store system or a server, notifying the user that a digital-offer-enabled product is nearby. The notification can indicate how far away within the store, and which direction the product is located, in which aisle the product is located, or other information. In some implementations, the user is guided to the shelf 215 by in-store signage. The signage can include brand promotion information, such as offer information, brand avatar representations (e.g., graphics, life-size cutouts), etc. In some implementations, the digital collectible application can be used by the user, as part of a gaming experience, to "hunt" for digital-offer-enabled products. For instance, the user can open the camera interface, and capture, using the camera of the mobile device 204, the shelf 215 (and other shelves or areas) to see if the digital collectible application recognizes, via machine learning, a digital-offer-enabled product. As another example, the digital collectible application can navigate the user, within the store, to promotion-related products using augmented reality. For instance, the user can have the digital collectible application open while walking through the store, and an avatar can be presented in the digital collectible application on top of a view of the store captured by the camera. The avatar can direct the user (through verbal hints, hand gestures, etc.), as the user walks through the store.

Figure 2D:
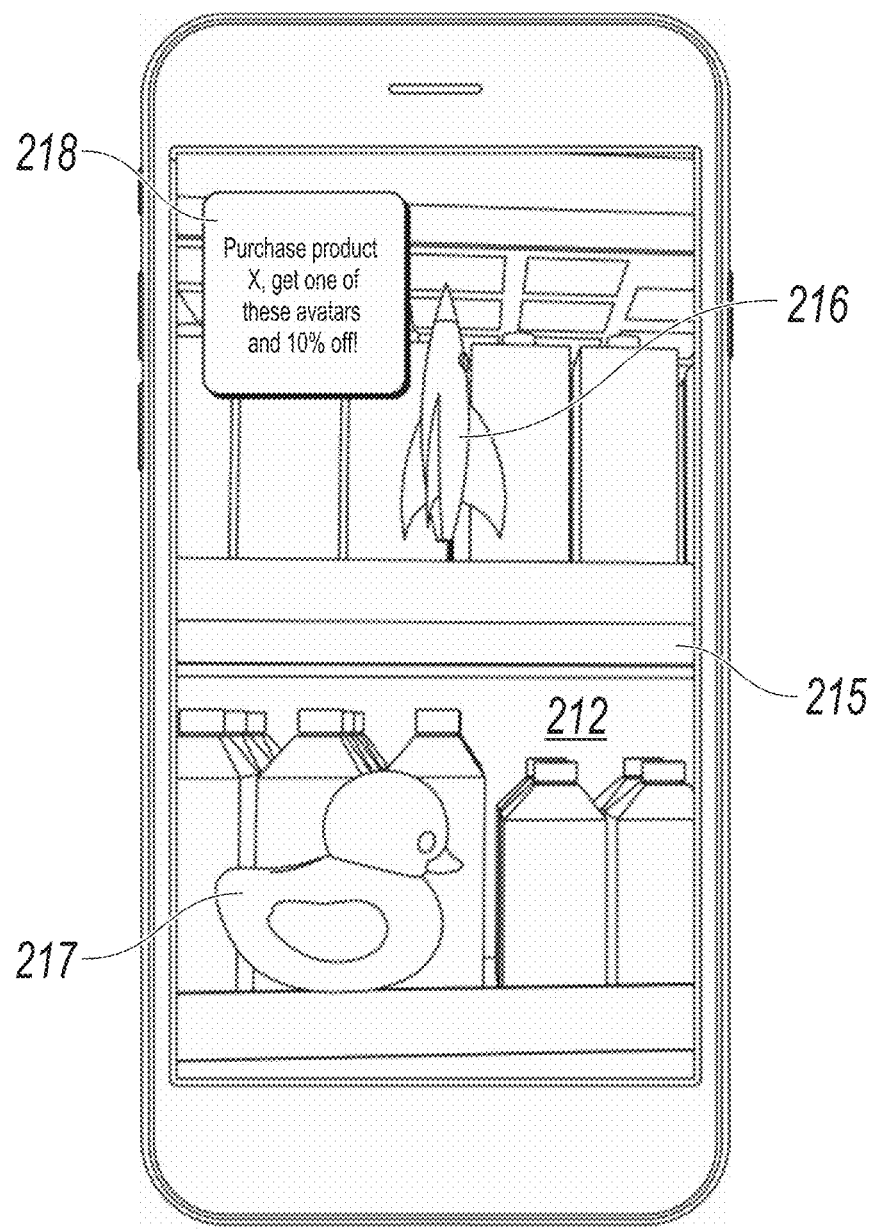

FIG. 2D illustrates a fourth stage in which computer-generated avatars 216 and 217 and an offer 218 are superimposed within the camera interface 212 in response to detection of a digital-offer-enabled product 220 Through augmented reality, the user can discover brand-specific digital collectibles and associated offers corresponding to on-shelf products. The digital-offer-enabled product 220 may have recently come into view within the camera interface 212, for example. The user may have used the camera interface 212 to scan the shelf 215 to initially focus on the digital-offer-enabled product 220 with the offer 218 and the avatars 216 and 217 being presented, as augmented reality, in the camera interface 212, in response to recognizing the product as associated with the digital offer.

The avatars 216 and 217 can be digital collectibles that can be obtained by the user upon purchasing of the digital-offer-enabled product 220. Digital collectible representations can be shown along with associated offers (e.g., the offer 218). As indicated in the offer 218, an associated offer can be that the user receives a price discount, as well as a digital collectible such as the avatar 216 or the avatar 217, upon purchasing the digital-offer-enabled product 220.

The user can continue to capture images of the shelf 215 (or other shelves or areas), using the camera of the mobile device 204, to detect other offers. For example, different brands or a same brand can have different digital-offer-enabled products. If an image of another digital-offer-enabled product comes into view in the camera interface 212, a different augmented reality presentation can be shown, in the camera interface 212, for the other digital-offer-enabled product.

Brands can compete to attempt to create compelling augmented reality experiences for the user that differentiate the brand from other brands. The augmented reality experience can include graphics, animation, video, audio, 3D models, text, or other content presentations that aim to convince the user that the digital collectibles are appealing and worthwhile to obtain. Brands can display indications to users as to what a fully upgraded avatar may look like, to encourage the users to interact with the avatar and obtain upgrades. A brand can promote an avatar as having a certain personality or as being compatible or integratable with various third party applications.

Certain avatars can be linked to certain products. For some products, one digital collectible is associated with the product, and the user can obtain that digital collectible upon product purchase. As another example, multiple digital collectibles can be associated with a product. In some implementations, the user can select which digital collectible they wish to obtain, either upon product-scanning or after the product has been purchased. In some instances, the digital promotion system can select which of multiple digital collectibles the user will obtain upon product purchase. For example, the digital promotion system can select a digital collectible based on user profile information (e.g., user behavior, user characteristics). Digital offers can also be customized based on user profile information.

In some implementations, if the user has already obtained a certain digital collectible, a different digital collectible is selected for the user. In some implementations, the user can obtain multiple instances of a particular digital collectible.

Digital collectibles can be shared among users, in some examples, as described below. As another example, the offer 218 can be tailored based on the user already having a digital collectible assigned to the product. For instance, the offer 218 can be for platform credit for digital collectible upgrades (which are described in more detail below).

In some examples, platform credit can be granted for user activity near the shelf 215. For instance, a nominal amount of platform credit can be granted when the user scans the digital-offer-enabled product 218. As another example, nominal platform credit can be granted to the user based on a user performing a social network "check-in" at the store (e.g., with a check-in social post including a platform-generated message indicating that the user is participating in a gamification experience related to the brand). To prevent fraud, non-purchase related platform credit can be nominal and capped.

Figure 2E:
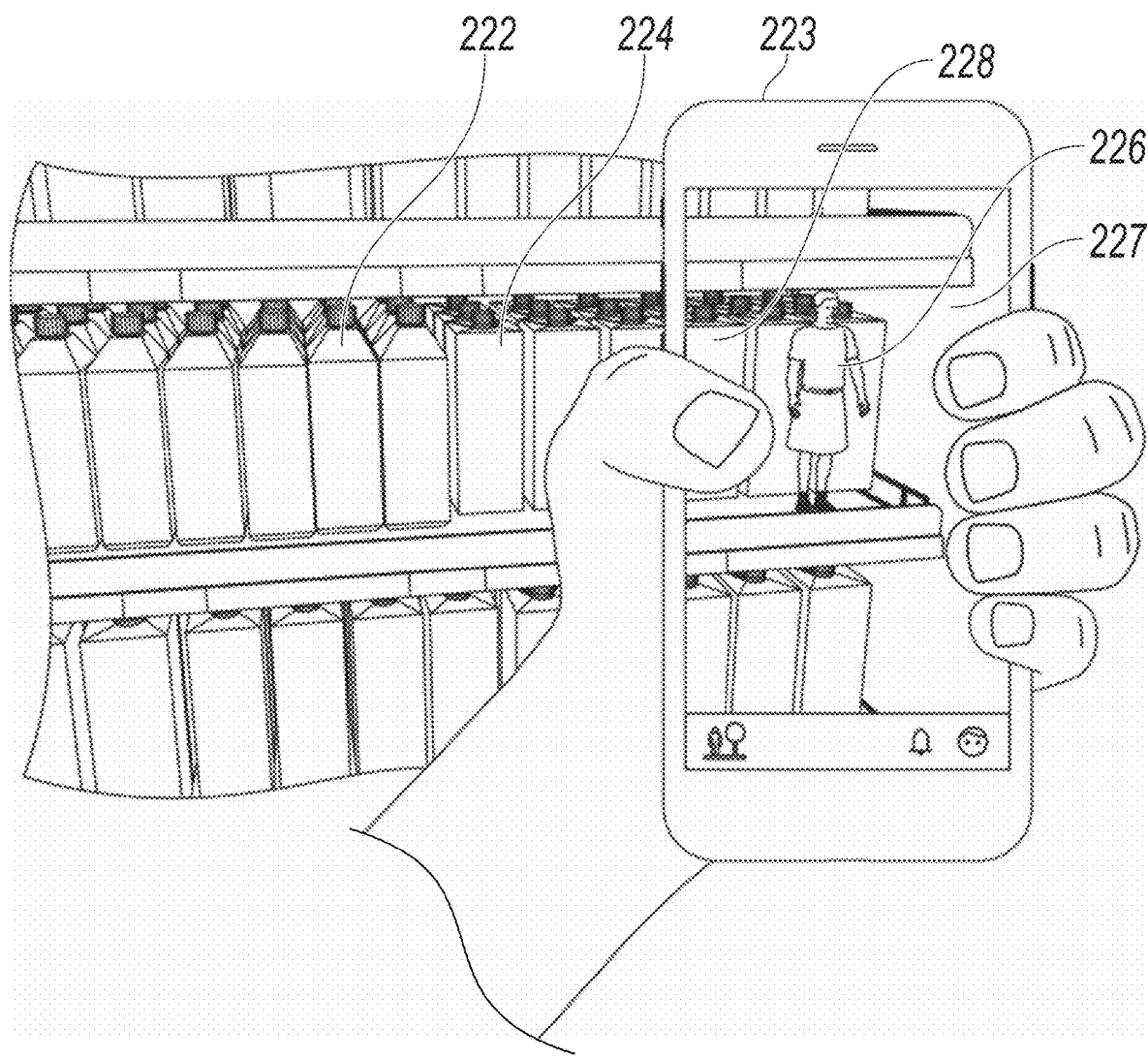

FIG. 2E illustrates an additional example of the fourth stage (labeled stage "4a"). A user 222 is using a mobile device 223 to capture an image of a shelf 224. An avatar 226 is displayed in a camera interface 227 on top of a view 228 of a product area, in response to determining that a product displayed in the product area is associated with a digital offer. In some implementations, the digital collectible application is configured to play a 3D augmented-reality animation of the avatar 226 speaking a message to the user 222. The message can explain to the user an opportunity to obtain a digital collectible version of the avatar 226 (and perhaps other benefit(s), such as a discount) upon purchasing the product. Along with a 3D animation, music can be played, and haptic (e.g., vibration) outputs can be generated.

Figure 2F:
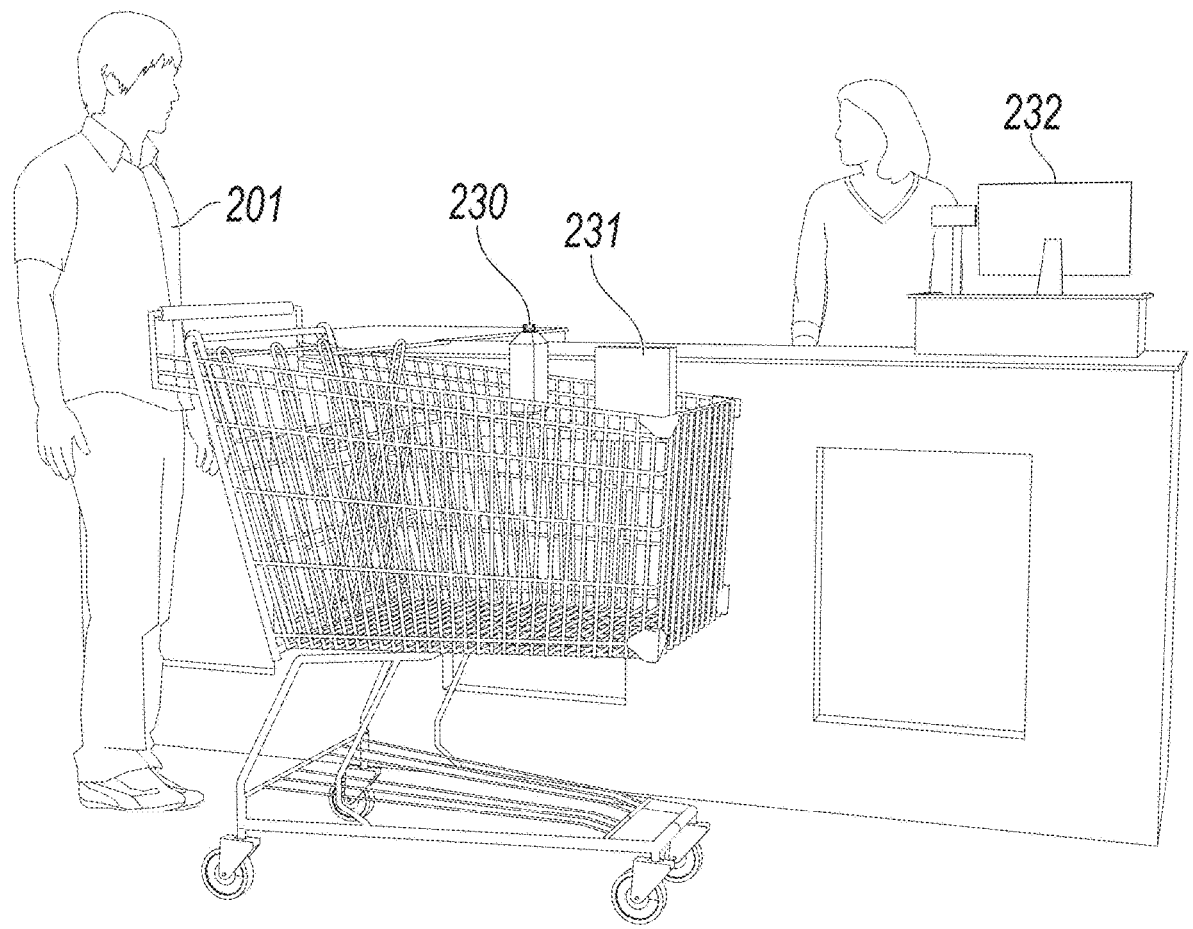

FIG. 2F illustrates a fifth stage in which the user 201 scans products 230 and 231 at a POS system 232. The POS system 232 can be configured to recognize that one or both of the products 230 and 231 are associated with digital offer(s). In response to detecting that a scanned product is associated with a digital offer, the POS system 232 can enable the user to scan a user identifier, as described below.

Figure 2G:
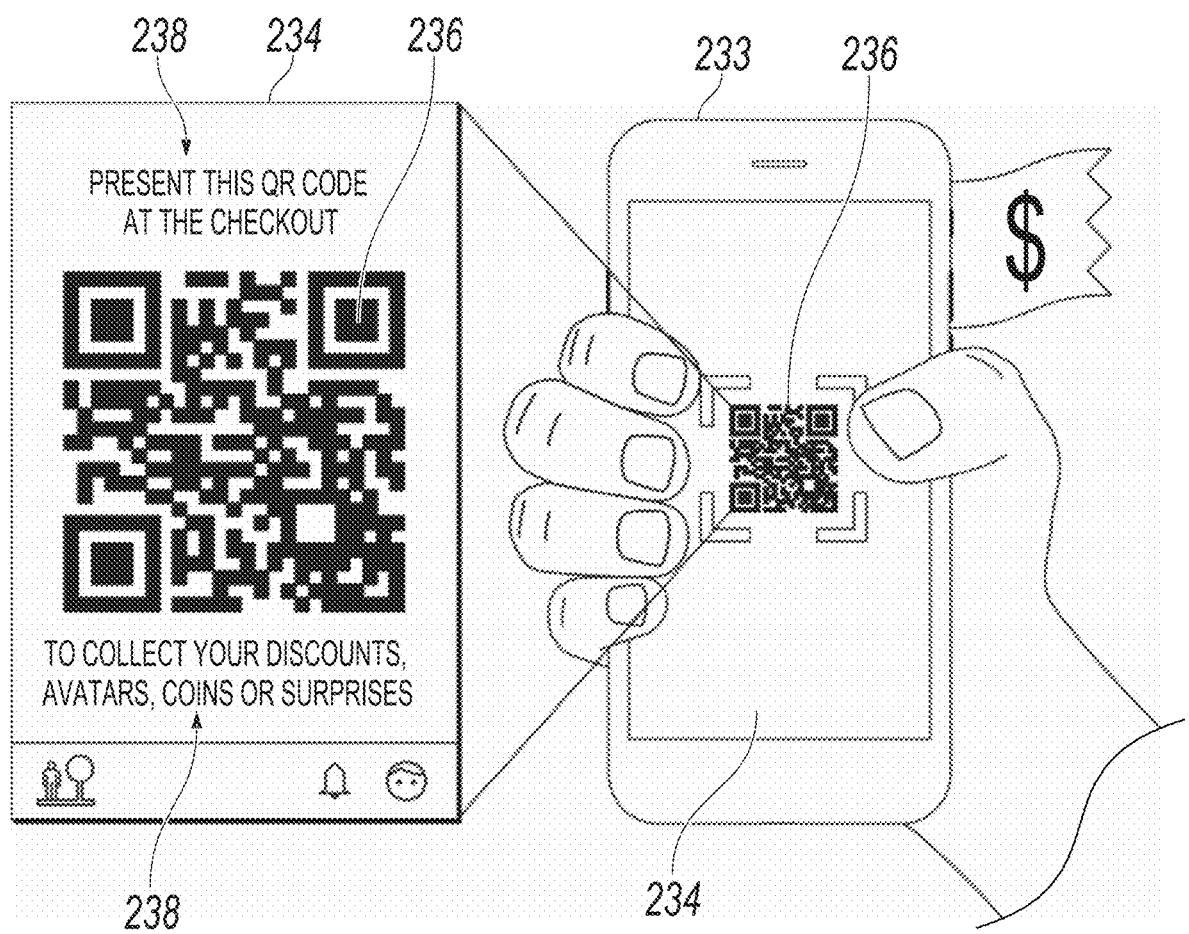

FIG. 2G illustrates a sixth stage in which the user 201 scans a user identifier at the POS system 232. A code-scan interface 234 is presented on a mobile device 233. The code scan interface 234 includes a code 236 (e.g., a QR code) and directions 238. The directions 238 instruct the user 201 to present the code 236 at checkout, to collect discounts, avatars (or other collectibles), coins (for platform credit), or other surprises.

The code-scan interface 234 can be presented to the user 201 as part of, or after, an augmented reality session that is presented in response to the user 201 scanning a product (e.g., as described in the fourth stage). The code-scan interface 234 can be presented to the user upon in response to product scanning at a shelf to remind the user 201 to present the code 236 at checkout. In some implementations, the POS system 232 is configured, upon detecting that a digital-offer-enabled product has been scanned, to present a message to a clerk and/or the user 201 (e.g. via a display in the check-out area) to prompt or remind the clerk or the user 201, respectively, to scan the code 236.

After the code 236 is scanned, any discounts applicable to purchased products can be applied before the POS system 232 processes the purchase. The POS system 232 can be configured to send the code 236 to the digital promotion system along with identifier(s) of purchased products. In some implementations, the code 236 includes both a user identifier and product identifier(s), and the POS system 232 is configured to send just the code 236 to the digital promotion system. Upon receiving a user identifier for the user 201 and product identifier(s) of digital-offer-enabled product(s), the digital promotion system can provide any earned digital collectible(s) to the user 201, as described below.

Other approaches can be used to link a product purchase to a particular user of the digital promotion platform. For example, a user can register a payment method (e.g., credit card) with the digital promotion platform and the POS system 232 can be configured to send a payment account identifier to the digital promotion system along with identifier(s) of purchased products. As another example, the user 201 can use a payment service associated with the mobile device 204 with the payment service being configured to detect purchase of a digital-offer-enabled product and to send a user identifier of the user 201 to the digital promotion system along with identifier(s) of purchased products.

The user 201 may have purchased multiple products from a same brand or from different brands, with each of those products associated with a digital collectible offer. The user 201 may have scanned some but not all of those products at the shelf (e.g., in stage four). Even though the user may have not seen or been aware of certain offers for certain products, the user's purchase of those products can still be recorded to enable the user 201 to obtain the benefits (e.g., discounts, collectibles, credits) of those unseen offers. In some implementations and for some products or offers, a user may have to interact with (e.g., scan) a product to receive the benefits (or full benefits) of an offer.

Figure 2H:
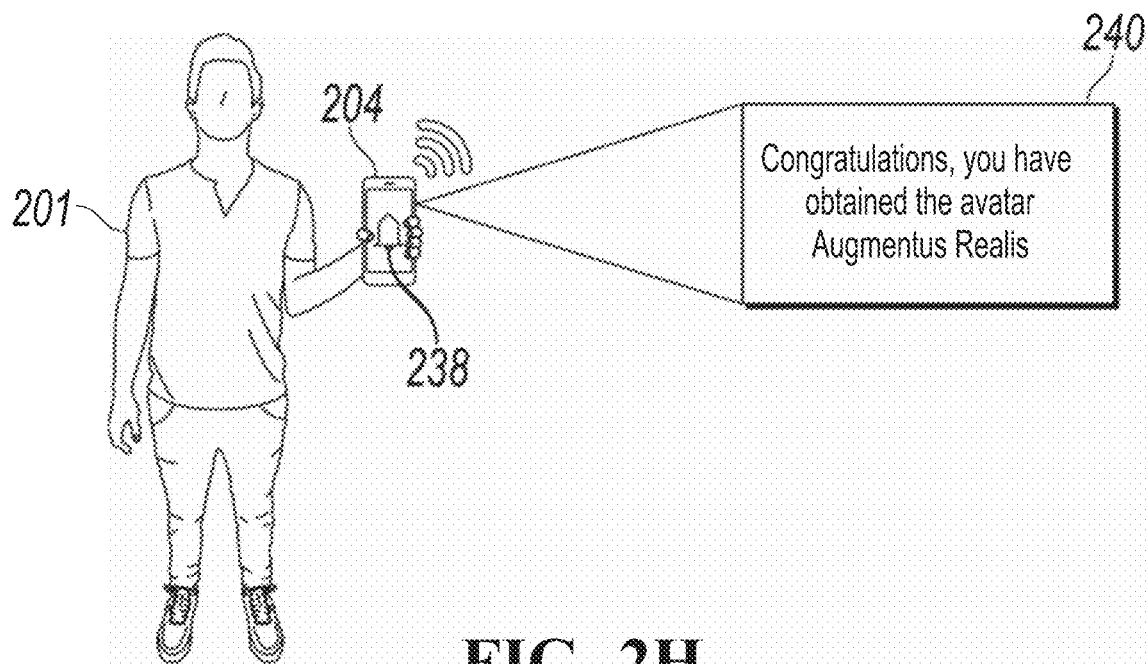

FIG. 2H illustrates a seventh stage in which the 201 receives an alert 238 and/or a notification 240 on the mobile device 204 from the digital promotion system in response to the digital promotion system determining that the user purchased a product with an offer for a digital collectible, notifying the user 201 that the digital collectible has been enabled for the user 201. In some implementations, an enabled digital collectible is placed in an application wallet for the user in the digital collectible application. As discussed below, the digital collectible can be enabled in the digital promotion platform and other affiliated third party systems. As mentioned, in some implementations, the user 201 may be prompted, after purchase completion, to select a particular digital collectible, if multiple digital collectibles are associated with a product. In some implementations, the digital collectible application is configured to request acceptance of the digital collectible from the user 201. In those implementations, the user 201 can accept, or decline the digital collectible.

Figure 2I:
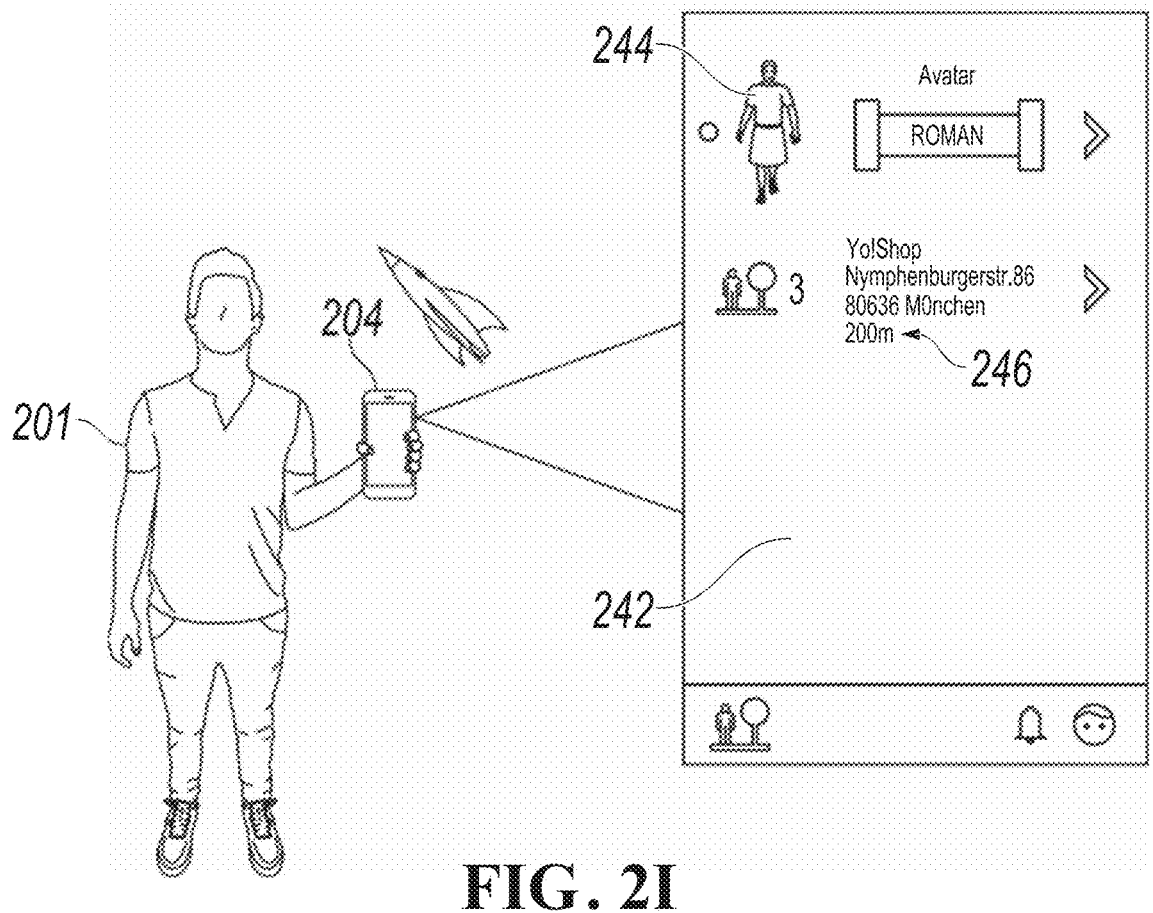

FIG. 2I illustrates an eighth stage in which an enabled digital collectible is presented in the digital collectible application. After receiving a notification about enablement of a digital collectible, the user 201 can open the digital collectible application. An interface 242 can be presented on the mobile device 204 which lists digital collectibles the user 201 has obtained, including an avatar 244. The interface 242 also presents information 246 that informs the user 201 that three digital offers are available at a nearby store. The user 201 can select the avatar 244 in the interface 242, to engage with the avatar 242.

Figure 2J:
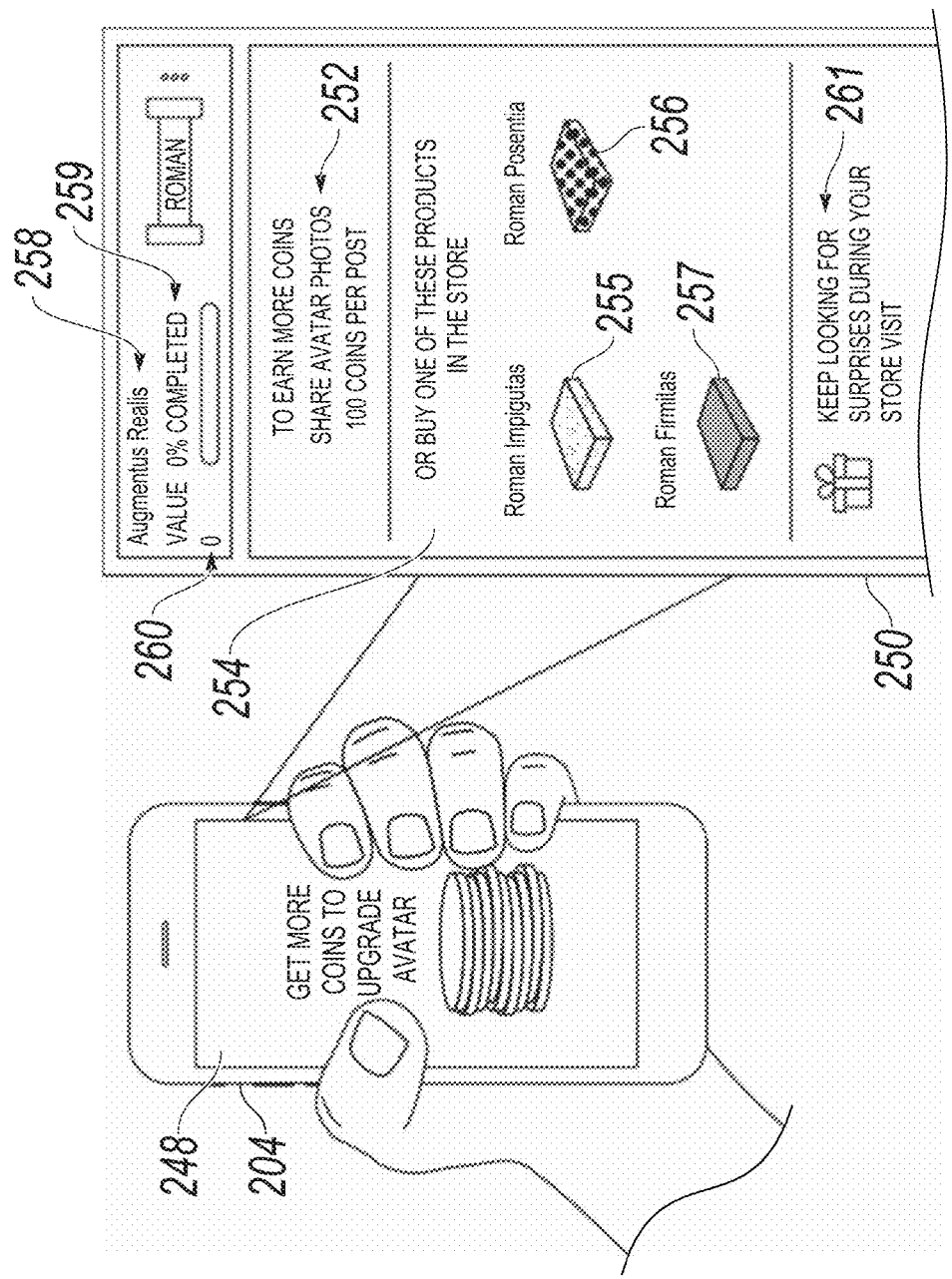

FIG. 2J illustrates a ninth stage in which the user 201 is presented options for earning credits that may be used to upgrade a digital collectible. A notification interface 248 can be presented on the mobile device 204 that notifies the user 201 that platform credits (coins) can be obtained to upgrade an avatar. In some implementations, the notification interface 248 (or another interface) shows additional detail, as shown in a credit-earning opportunity interface 250. A message 252 informs the user 201 that platform credits can be earned by social network sharing of images that include the avatar. A notification area 254 informs the user 201 that platform credits can be earned by purchasing products corresponding to product images 255, 256, and 257.

An avatar status area 258 includes an avatar upgrade status 259 (e.g., currently indicating 0% upgrade completion) and an upgraded avatar value (e.g., currently at zero since no upgrades have been made). A message 261 encourages the user to look for surprises during engagements with the digital promotion system during future store visits. Surprises can include special offers or promotions (for other avatars or platform credit), product discounts, special digital collectible upgrade options, or other offers. Once the user 201 has a digital collectible, a brand can use the digital promotion system to send personalized offers to the user, related to a user's obtained digital collectibles or to other available digital collectibles that the system has determined may be of interest to the user 201.

In general, platform credits can be granted to a user for the user's assistance with brand promotion through the user's activity regarding brand-promoting digital collectibles. Other platform credit earning opportunities can include scanning products (as mentioned), and other social activity related to the digital collectible. For instance, other than earning credit for posting a message including a digital collectible, in some implementations, the user can earn credit when other social network occurs with a user's social network post that includes a brand-promoting digital collectible, such as when the post is further shared or forwarded on a social network, or when other social network users comment on the post. In some implementations, a user can earn platform credit by referring other users to the digital promotion platform.

As mentioned, enablement of a digital collectible can include enabling the digital collectible in third party environments. For instance, if a user has obtained an avatar, that avatar can be exported to a third party gaming environment and used in online gaming. In some implementations, a user may have to upgrade a digital collectible to be able to use the digital collectible in a third party environment. In some implementations, a user can earn platform credit by using the digital collectible in a third party environment. For example, a user can receive platform credit for using a brand-promoting avatar in an online game. In some instances, a user's performance in an online gaming environment when being represented in the environment by a digital collectible can affect how much platform credit is earned. For instance, the higher a user places on a leaderboard can result in a higher amount of platform credit, since a higher placement on a leaderboard may be deemed to be more beneficial promotion of a brand than a lower placement. For example, the digital collectible may appear on the leaderboard and be visible to other users of the environment.

In some implementations, the digital promotion system provides its own environment(s) (e.g., gaming environments) in which users of the digital promotion system can engage with other users while being represented, at least in part, by a digital collectible earned within the system. In some implementations, the digital promotion system includes a digital collectible marketplace in which users of the digital platform can gift, trade, or sell digital collectibles or digital collectibles upgrades to other users. Currencies that can be used in the digital collectible marketplace can be actual money, platform credit, or both.

Figure 2K:
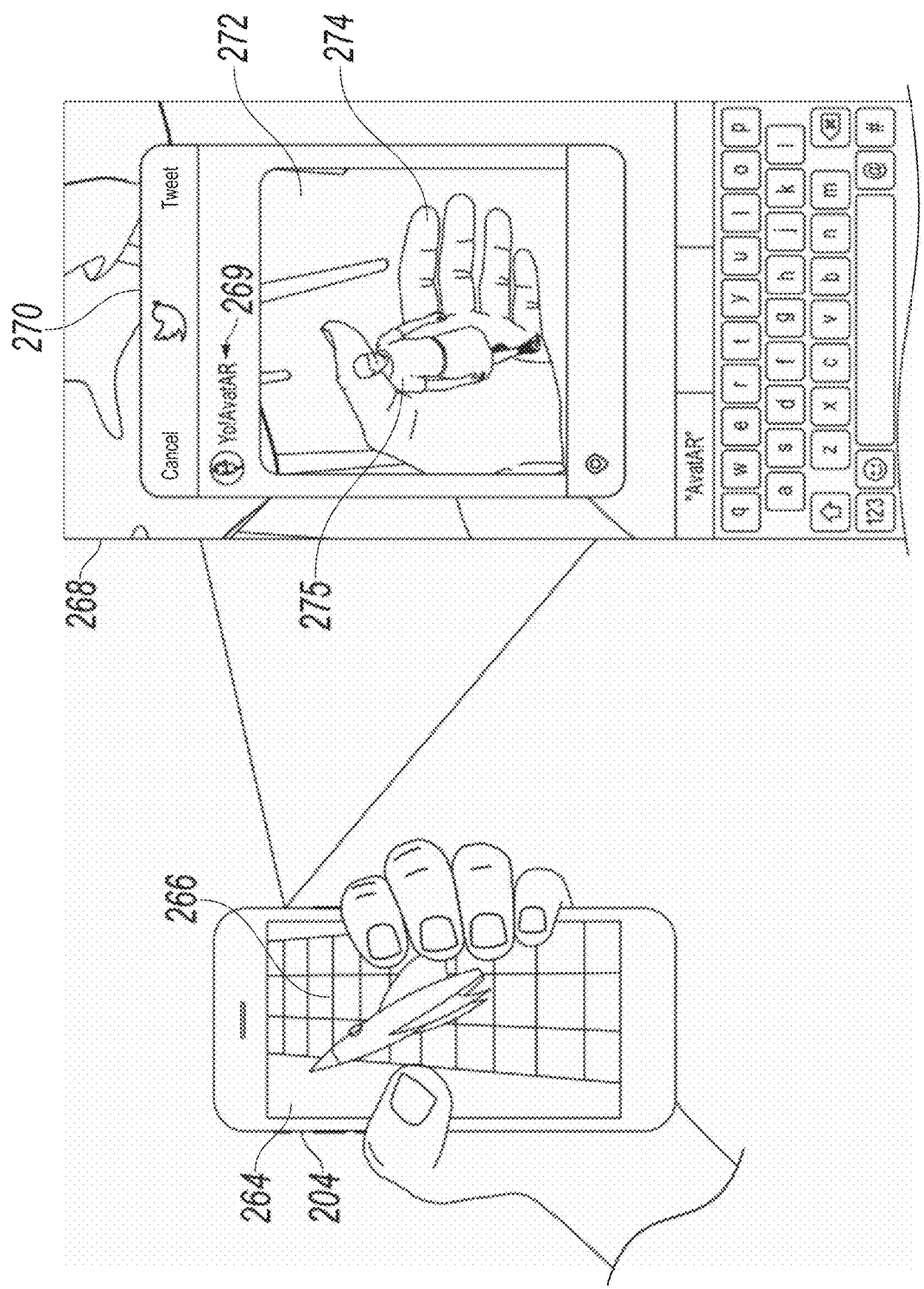

FIG. 2K illustrates a tenth stage in which a user engages with a digital collectible. The user 201 can use an augmented reality interface 264 to place an avatar 266 into a view of the real world. The augmented reality interface 264 can be a camera interface that shows a view as captured by a camera of the mobile device 204, where the view can include superimpositions of digital collectible(s) owned by the user 201. The user 201 can virtually place the avatar 266 on a surface, for example, so that the avatar 266 appears to actually be positioned on the surface when the surface is displayed in the augmented reality interface 264. The user 201 can capture images or video of the augmented reality display. The user 201 can share captured augmented reality videos or images that include brand-sponsored digital collectibles, to earn platform credit, for example.

For instance, as shown in a more detailed interface 268, the user 201 is composing a social network message 269 (e.g., a "tweet") in a composition window 270. The social network message 269 includes an augmented reality image 272 that includes an image 274 of a hand of the user 201 and an avatar 275 that has been virtually placed on a real-world surface. The user 201 can post the social network message 269, with the augmented reality image 272, to a social network system. In some implementations, the digital promotion platform automatically inserts a brand-related hashtag or other key word(s) into the social network message 269. The composition window 270 may be provided by the digital promotion system or may be a standard social networking application not directly affiliated with the digital promotion system.

If the composition window 270 is provided by the digital promotion system, the digital promotion system can automatically know that the user 201 has sent a social network post with a brand-related digital collectible, and can automatically grant platform credit to the user 201 after the social network message 269 has been sent. If the user 201 uses a standard social networking application not directly affiliated with the digital promotion system, the user 201 can be encouraged to use, for example, a brand-related hashtag. The user 201 can post, using a social network application, a saved image or video that includes the avatar, for example. The digital promotion system can be configured to periodically query the social network system for posts that include the brand-related hashtag, determine which posts also include a digital collectible, identify users who made such posts, and award attribution platform credit accordingly.

Figures 1, 2L:
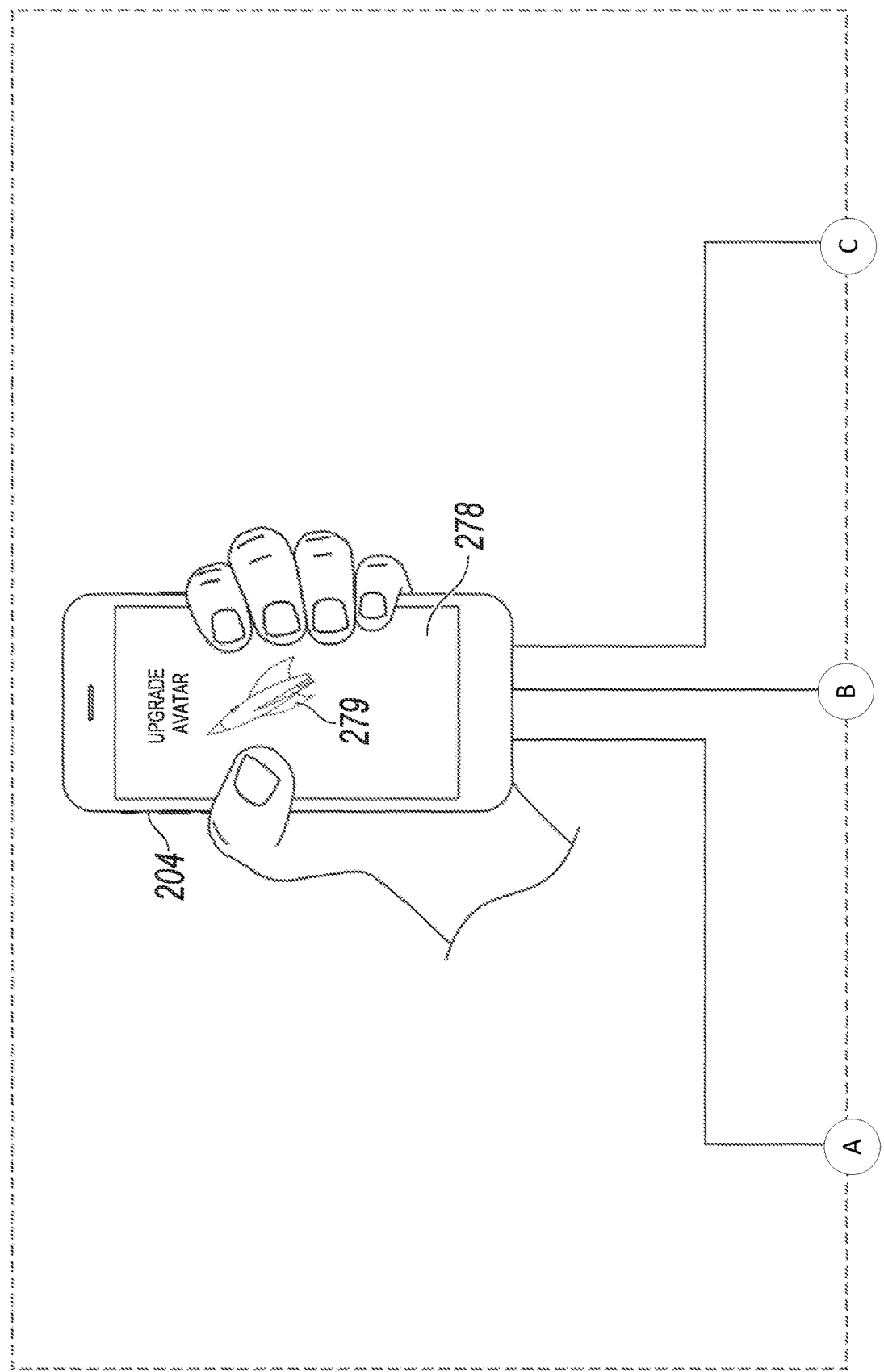
Figures 2, 2L:
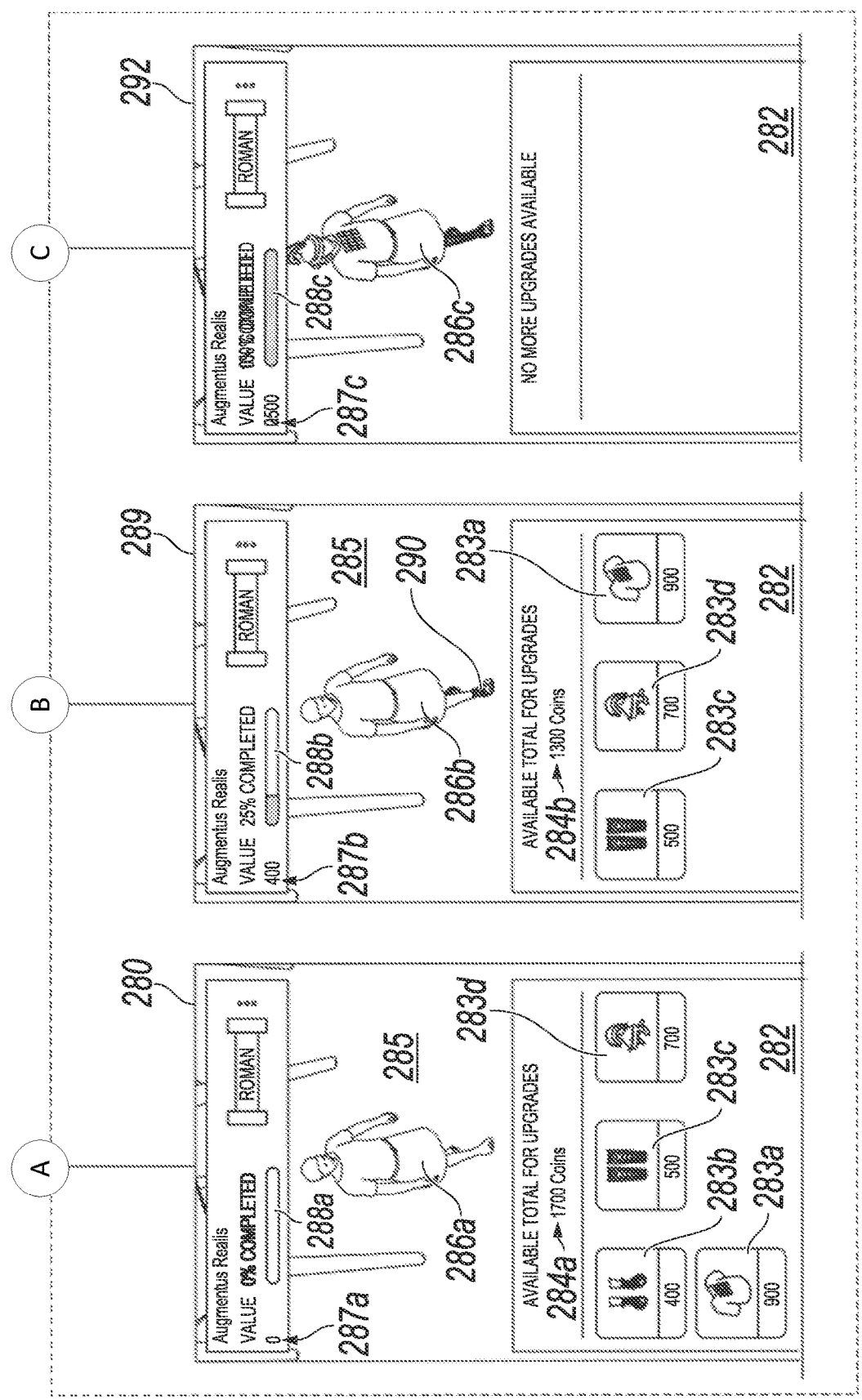

FIG. 2L illustrates an eleventh stage in which a user upgrades a digital collectible. The digital collectible application can include an upgrade interface 278 through which the user 201 can upgrade an avatar 279 or other digital collectible.

As a more detailed example, an upgrade interface 280 includes an upgrade panel 282 that includes upgrade items 283a, 283b, 283c, and 283d that are available for selection. Each respective upgrade item 283a-d includes an image of the respective upgrade item and a platform credit cost (e.g., number of coins) that is required to obtain the respective upgrade item. For example, the upgrade item 283b is a pair of shoes that would cost four hundred platform credits to obtain. As another example, the upgrade item 283c is a pair of leggings that would cost five hundred platform credits to obtain. A platform credit balance 284 of seventeen hundred coins for the user 201 is displayed in the upgrade panel 282. The upgrade panel 282 is currently displayed on top of an augmented reality view 285 that includes an avatar 286a. The avatar 286a currently has no upgrades, as indicated by an avatar value 287a of zero and a completion status 288a of zero percent.

An upgrade interface 289 reflects changes after the user 201 has made an avatar upgrade. The user has selected the upgrade item 283b for the avatar 286a. The augmented reality view 285 now includes an upgraded avatar 286b that includes shoes 290 (e.g., the upgrade item 283b). The upgrades to the upgraded avatar 286b can be presented in the augmented reality view 285 on the upgraded avatar 286b while the upgraded avatar 286b is superimposed over a view captured by the mobile device camera. An updated avatar value 287b reflects a value of the added upgrade item 283b. An updated platform credit balance 284b of thirteen hundred reflects the upgrade of the upgrade item 283b. An updated completion status 288b reflects a now partial-completion of the avatar 286b. The user can make other upgrades (e.g., by selecting the upgrade items 283a, 283c, and 283d, assuming the user 201 has sufficient platform credit.

An upgrade interface 292 reflects changes after a user has completed the upgrade of an avatar. The upgrade panel 282 indicates that no more upgrades are available for a completed avatar 286c. An updated avatar value 287c reflects a value of the completed avatar 286c. An updated completion status 288b reflects the completion of the completed avatar 286c.

Figure 3:
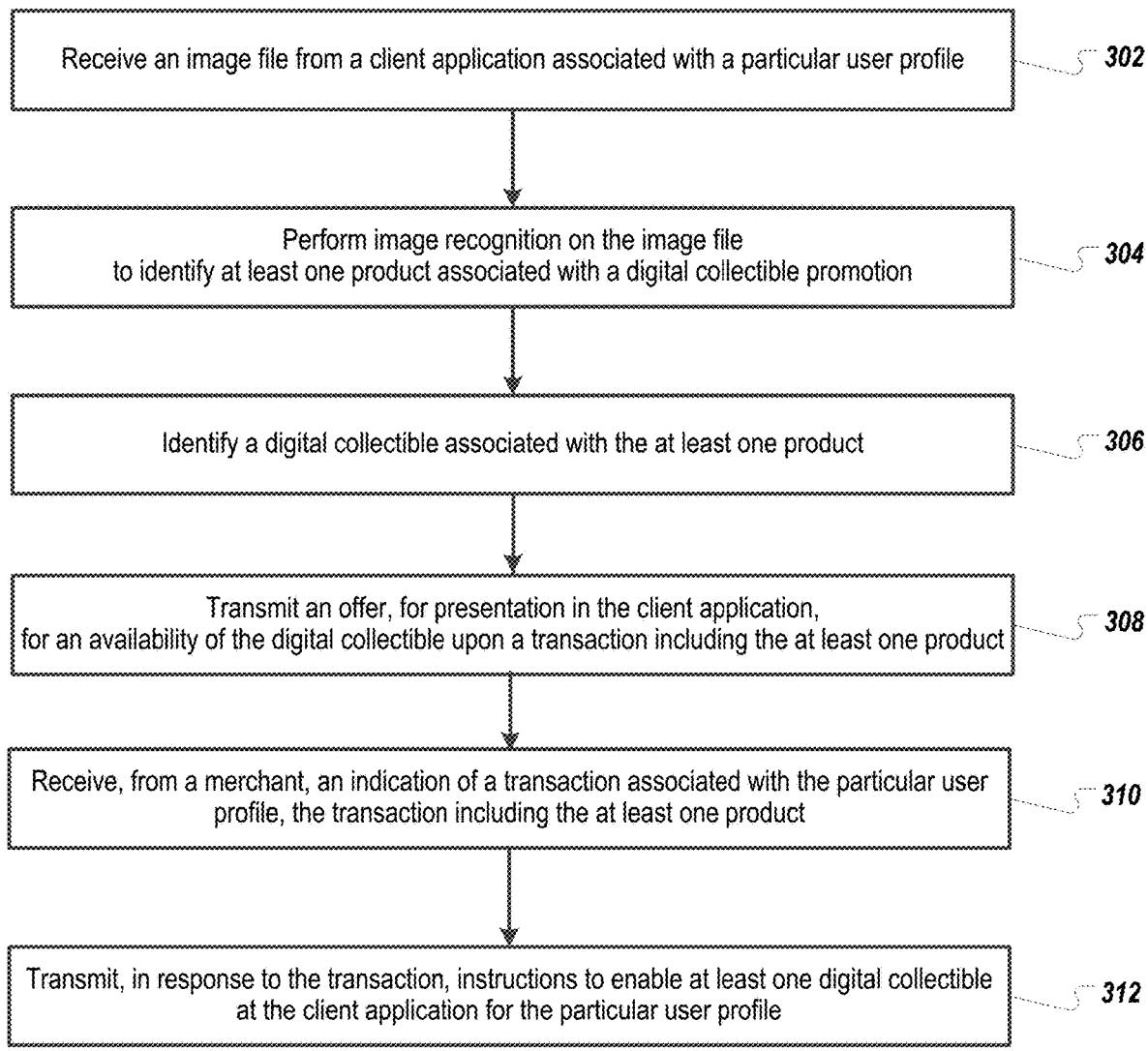
FIG. 3 is a flowchart of an example method for providing digital promotions using digital collectibles.

FIG. 3 is a flowchart of an example method 300 for providing digital promotions using digital collectibles. It will be understood that method 300 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 300 and related methods are executed by one or more components of the system 100 described above with respect to FIG. 1. For example, the method 300 and related methods can be executed by the digital promotion system 102 of FIG. 1.

At 302, an image file is received from a client application associated with a particular user profile. The image file can be received when a user is scanning for products that may be associated with one or more digital collectible promotions. A client device can send images to a server, for example.

At 304, image recognition on the image file is performed to identify at least one product associated with a digital collectible promotion. In some implementations, the image recognition is performed by the client application, rather than the server, using a library of product images stored on the client device.

At 306, a digital collectible associated with the at least one product is identified.

At 308, an offer is transmitted, for presentation in the client application, for an availability of the digital collectible upon a transaction including the at least one product.

At 310, an indication of a transaction associated with the particular user profile is received from a merchant. The transaction includes the at least one product.

At 312, instructions are transmitted, in response to the transaction, to enable at least one digital collectible at the client application for the particular user profile.

Figure 4:
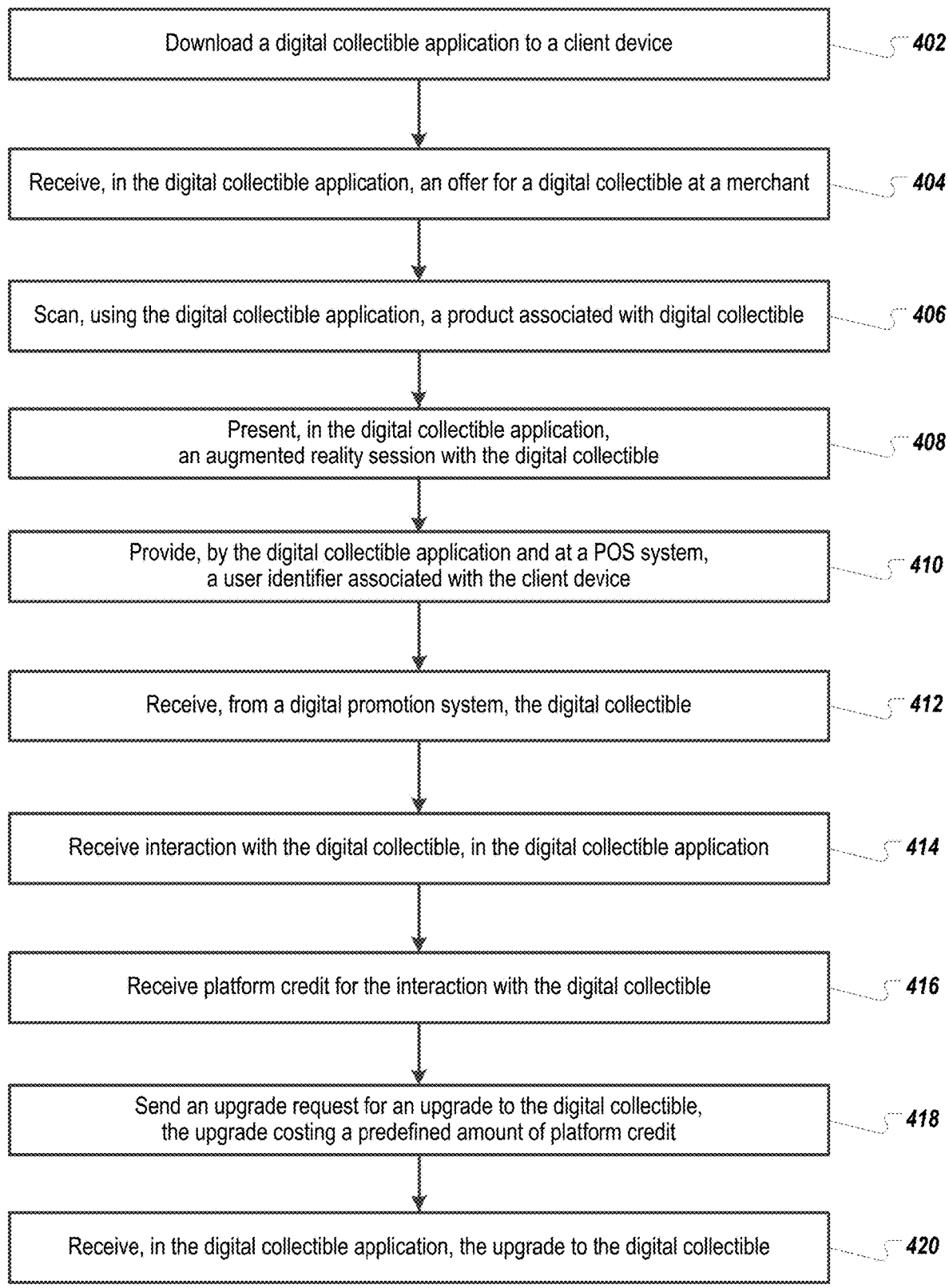
FIG. 4 is a flowchart of an example method for using a digital promotion system.

FIG. 4 is a flowchart of an example method 400 for providing digital promotions using digital collectibles. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the mobile device 102 of FIG. 1.

At 402, a digital collectible application is downloaded to a client device.

At 404, an offer is received, in the digital collectible application, for a digital collectible that is available at a merchant. For example, the digital collectible application can determine that the client device is within a predetermined distance from the merchant. As another example, the client device can receive the offer based on a server determining that the client device is within a predetermined distance from the merchant.

At 406, a product associated with the digital collectible is scanned, using the digital collectible application. For example, a user can scan the product that is on a shelf at the merchant.

At 408, an augmented reality session that includes the digital collectible is presented, in the digital collectible application. For example, the digital collectible can be superimposed in an interface when the user uses a camera interface of the digital collectible application to scan the product.

At 410, a user identifier associated with the client device is provided, by the digital collectible application, at a POS system. For example, the digital collectible application can present a code (e.g., a QR code) that the user scans at a scanning device at the POS.

At 412, the digital collectible is received, from a digital promotion system. The digital promotion system can determine that the user bought the product associated with the digital collectible, based on information the server receives from the POS system.

At 414, an interaction with the digital collectible is received, in the digital collectible application. For example, the user can make a social network post that includes the digital collectible.

At 416, platform credit for interacting with the digital collectible is received. A notification of the received platform credit can be received by the client device.

At 418, an upgrade request for an upgrade to the digital collectible is sent, e.g., to a server, based on a user input. The upgrade costs a predefined amount of platform credit.

At 420, the upgrade to the digital collectible is received, in the digital collectible application. The digital collectible can subsequently be presented as having the upgrade, when the user interacts with the digital collectible.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
    determining, by at least one processor of a device associated with a particular user profile, that the device is located at a first location corresponding to a physical establishment offering a first product associated with a digital collectible promotion for a digital collectible;
    in response to determining that the device is located at the first location corresponding to the physical establishment, updating a user interface of a client application running on the device to display a first augmented reality presentation of the digital collectible;
    further updating the user interface of the client application in response to determining a change in location within the physical establishment by using the first augmented reality presentation of the digital collectible to present navigational guidance to a second location located within the physical establishment where the first product is located;
    capturing, by the device and while the device is at the second location, an image file that includes an image of the first product;
    providing the image file as input to a machine learning component that is trained to identify product images and determine which product images are associated with products that are associated with digital collectible promotions based on characteristics of the product that are known by the machine learning component, wherein the machine learning component uses a library of stored product images to compare to the provided image file to identify the product images associated with the image of the first product;
    receiving an output from the machine learning component that indicates that the image file corresponds to the first product associated with the digital collectible promotion, wherein the output is used to further train the machine learning component;
    in response to the output from the machine learning component, updating the user interface to present a first offer for an opportunity to obtain the digital collectible upon a transaction including the first product, wherein presenting the first offer comprises:
        updating the user interface to present a second augmented reality presentation of the digital collectible;
        superimposing, in the user interface, the second augmented reality presentation of the digital collectible on top of the image of the first product; and
        using the superimposed second augmented reality presentation of the digital collectible to present the first offer for the opportunity to obtain the digital collectible in the user interface; and
    receiving instructions to enable the digital collectible at the client application for the particular user profile, based on a completed transaction associated with the particular user profile that includes the first product.

2. The computer-implemented method of claim 1, wherein the library of product images is stored on the device.

3. The computer-implemented method of claim 1, further comprising receiving, by the client application, an indication of an interaction with the digital collectible at a client device.

4. The computer-implemented method of claim 3, further comprising receiving digital credit for an account of the user profile for the interaction, the digital credit usable for upgrading the digital collectible.

5. The computer-implemented method of claim 4, further comprising receiving an upgrade request, by the client application, to upgrade the digital collectible.

6. The computer-implemented method of claim 5, further comprising receiving, in response to the upgrade request, instructions to enable an upgrade for the digital collectible at the client application for the particular user profile wherein the account associated with the user profile is debited by an amount associated with the upgrade.

7. The computer-implemented method of claim 1, further comprising
    providing a request to integrate the digital collectible in at least one third party digital system.

8. A system comprising:
    one or more computers; and
    a computer-readable medium coupled to the one or more computers having instructions stored thereon which, when executed by the one or more computers, cause the one or more computers to perform operations comprising:
        determining that a device associated with a particular user profile is located at a first location corresponding to a physical establishment offering a first product associated with a digital collectible promotion for a digital collectible;
        in response to determining that the device is located at the first location corresponding to the physical establishment, updating a user interface of a client application running on the device to display a first augmented reality presentation of the digital collectible;
        further updating the user interface of the client application in response to determining a change in location within the physical establishment by using the first augmented reality presentation of the digital collectible to present navigational guidance to a second location located within the physical establishment where the first product is located;
        capturing, by the device and while the device is at the second location, an image file that includes an image of the first product;
        providing the image file as input to a machine learning component that is trained to identify product images and determine which product images are associated with products that are associated with digital collectible promotions based on characteristics of the product that are known by the machine learning component, wherein the machine learning component uses a library of stored product images to compare to the provided image file to identify the product images associated with the image of the first product;
        receiving an output from the machine learning component that indicates that the image file corresponds to the first product associated with the digital collectible promotion, wherein the output is used to further train the machine learning component;
        in response to the output from the machine learning component, updating the user interface to present a first offer for an opportunity to obtain the digital collectible upon a transaction including the first product, wherein presenting the first offer comprises:

updating the user interface to present a second augmented reality presentation of the digital collectible;

superimposing, in the user interface, the second augmented reality presentation of the digital collectible on top of the image of the first product; and using the superimposed second augmented reality presentation of the digital collectible to present the first offer for the opportunity to obtain the digital collectible in the user interface; and receiving instructions to enable the digital collectible at the client application for the particular user profile, based on a completed transaction associated with the particular user profile that includes the first product.

9. The system of claim 8, wherein the library of product images is stored on the device.

10. The system of claim 8, wherein the operations further comprise receiving, by the client application, an indication of an interaction with the digital collectible at a client device.

11. The system of claim 10, wherein the operations further comprise receiving digital credit for an account of the user profile for the interaction, the digital credit usable for upgrading the digital collectible.

12. The system of claim 11, wherein the operations further comprise receiving an upgrade request, by the client application, to upgrade the digital collectible.

13. A computer program product encoded on a non-transitory storage medium, the product comprising non-transitory, computer readable instructions for causing one or more processors to perform operations comprising:

determining that a device associated with a particular user profile is located at a first location corresponding to a physical establishment offering a first product associated with a digital collectible promotion for a digital collectible;

in response to determining that the device is located at the first location corresponding to the physical establishment, updating a user interface of a client application running on the device to display a first augmented reality presentation of the digital collectible;

further updating the user interface of the client application in response to determining a change in location within the physical establishment by using the first augmented reality presentation of the digital collectible to present navigational guidance to a second location located within the physical establishment where the first product is located;

capturing, by the device and while the device is at the second location, an image file that includes an image of the first product;

providing the image file as input to a machine learning component that is trained to identify product images and determine which product images are associated with products that are associated with digital collectible promotions based on characteristics of the product that are known by the machine learning component, wherein the machine learning component uses a library of stored product images to compare to the provided image file to identify the product images associated with the image of the first product;

receiving an output from the machine learning component that indicates that the image file corresponds to the first product associated with the digital collectible promotion, wherein the output is used to further train the machine learning component;

in response to the output from the machine learning component, updating the user interface to present a first offer for an opportunity to obtain the digital collectible upon a transaction including the first product, wherein presenting the first offer comprises:

updating the user interface to present a second augmented reality presentation of the digital collectible;

superimposing, in the user interface, the second augmented reality presentation of the digital collectible on top of the image of the first product; and using the superimposed second augmented reality presentation of the digital collectible to present the first offer for the opportunity to obtain the digital collectible in the user interface; and receiving instructions to enable the digital collectible at the client application for the particular user profile, based on a completed transaction associated with the particular user profile that includes the first product.

14. The computer program product of claim 13, wherein the library of product images is stored on the device.

15. The computer program product of claim 13, wherein the operations further comprise receiving, by the client application, an indication of an interaction with the digital collectible at a client device.

16. The computer program product of claim 15, wherein the operations further comprise receiving digital credit for an account of the user profile for the interaction, the digital credit usable for upgrading the digital collectible.

\* \* \* \* \*